United States Patent [19]

Goldman

[11] 4,278,576

[45] Jul. 14, 1981

[54] ISOLATION AND IMPROVEMENT OF IMPACT MODIFIER POLYMER POWDERS

[75] Inventor: Theodore D. Goldman, Washington Crossing, Pa.

[73] Assignee: Rohm and Haas Company, Philadelphia, Pa.

[21] Appl. No.: 966,695

[22] Filed: Dec. 5, 1978

[51] Int. Cl.³ ............... C08K 9/04; C08L 9/02; C08L 9/06
[52] U.S. Cl. ............... 260/23 AR; 106/308 F; 260/23 XA; 260/23 S; 260/42.14; 260/42.44; 260/42.49
[58] Field of Search ........... 260/23 XA, 23 S, 23 AR, 260/42.14, 42.44, 42.49; 106/308 F

[56] References Cited

U.S. PATENT DOCUMENTS

| | | | |
|---|---|---|---|
| 2,927,091 | 3/1960 | Liggett | 260/42.14 |
| 3,446,765 | 5/1969 | Pryer | 260/42.14 |
| 3,803,065 | 4/1974 | Arai et al. | 260/42.14 |
| 3,883,489 | 5/1975 | Matschke et al. | 526/7 |
| 3,985,703 | 10/1976 | Ferry et al. | 260/857 G |
| 3,985,704 | 10/1976 | Jones et al. | 260/879 |
| 3,996,173 | 12/1976 | Heichele et al. | 260/42.49 |
| 4,096,202 | 6/1978 | Farnham et al. | 260/876 R |

*Primary Examiner*—Ronald W. Griffin
*Attorney, Agent, or Firm*—Michael B. Fein

[57] ABSTRACT

Impact modifier polymer powders are isolated by a process comprising introducing about 0.5 to 50% by weight of stearate coated calcium carbonate having an average particle size of about 0.04 to 1 micron based on polymer and stearate coated calcium carbonate mixture. The resultant mixture has improved anti-compaction properties as well as powder flow. Blends of impact modifier and thermoplastic matrix polymer are also unexpectedly improved. Impact modifier with higher than normal rubber levels can be isolated.

24 Claims, No Drawings

ISOLATION AND IMPROVEMENT OF IMPACT MODIFIER POLYMER POWDERS

BACKGROUND OF THE INVENTION

1. Field of the Invention

This invention relates to isolation and improvement of impact modifier polymer powders and to blends of thermoplastic matrix polymers with such impact modifier polymer powders.

2. Description of the Prior Art

Isolation of impact modifier polymers while simultaneously adding finely divided inorganic materials is known. Ferry et al U.S. Pat. No. 3,985,703 and Jones et al U.S. Pat. No. 3,985,704 suggest use of inert particulate material being blown into a spray dryer during isolation of impact modifier polymers.

Matschke et al U.S. Pat. No. 3,883,489 suggest finely divided silica, aluminum silicates or calcium carbonate having an average particle size of from 0.01 to 0.5 micron as anti-caking agents being added during spray drying of vinyl acetate-ethylene copolymer dispersable powders for use as glues, adhesives and paints, and as binding agent in plastic mortars. The powders have improved dispersability and improved storage life.

Except for one patent, Heichle et al U.S. Pat. No. 3,996,173, no one has suggested the use of stearate coated calcium carbonate in combination with an impact modifier polymer. However, Heichle et al only teach a synergistic impact strength improvement effect in a ternary composition of PVC, impact modifier polymer, and stearate-coated calcium carbonate. Neither Heichle et al nor anyone else teach isolation of the impact modifier using the stearate coated calcium carbonate, or the resultant binary blends.

SUMMARY OF THE INVENTION

While conventional inert particulate materials such as fumed silica, aluminum silicate and calcium carbonate do function well as spray drying aids in isolation of impact modifier polymers, it has been recognized that at higher levels of such spray drying aids, e.g. above about 1.5% based on dry weight of acrylic core-shell polymer impact modifier, deleterious effects on the physical or optical properties of the modifier/matrix blend such as clarity, impact strength, melt flow properties, etc., occur. However, it was also recognized that higher levels of such spray drying aids would have been advantageous in achieving desired improved drying and flow characteristics.

It is therefore an object of the present invention to provide a novel and improved method of isolating impact modifier polymers as powders.

It is also an object to provide novel blends of impact modifier polymer and spray drying aid which are free from the deleterious side effects attendant with prior spray dry aids when used as higher levels. These and other objects as well become apparent from the following disclosures are achieved by the present invention which comprises the discovery of a method of isolating impact modifier polymers as free flowing powders and imparting anti-compaction properties to such powders without imparting any of the previously expected deleterious effects of spray drying aids at higher levels comprising introducing, based on weight of impact modifier polymer and stearate coated calcium carbonate, about 0.5 to 50% of stearate coated calcium carbonate having an average particle size of about 0.04 to 1 micron, after formation of said polymer but before or during isolation; and the discovery of novel binary blends of the impact modifier polymer and the stearate coated calcium carbonate.

DETAILED DESCRIPTION OF THE INVENTION AND THE PREFERRED EMBODIMENTS

The impact modifier polymers isolated in accordance with the present invention are any of those known in the art for modifying other polymers. The other polymers, or "matrix" polymers, can be polyvinyl chloride, nylon, polymethyl methacrylate, polystyrene, thermoplastic polyesters such as polyethylene terephthalate, polybutylene terephthalate, polycyclohexanedimethanol terephthalate, and polyolefins such as polyethylene, polypropylene, and any other matrix polymer which can be improved by an impact modifier.

The impact modifiers which are isolated in accordance with the process of this invention, and are part of the composition of this invention, are methacrylate-butadiene-styrene graft polymers, for example those described in U.S. Pat. No. 3,985,704; acrylic core/shell polymers, for example those described in U.S. Pat. No. 3,985,703, or analogs of these wherein the rubber content may be from 60 to 100% of the total polymeric material;

acrylonitrile-butadiene-styrene copolymers; ethylene-vinyl ester copolymers; chlorinated polyethylene; mixtures of two or more of the above, and others as should be apparent to those skilled in the art. Impact modifiers with higher than normal rubber levels can be isolated by the method of this invention; for example even rubber levels of over 85% of the impact modifier polymer can now be isolated readily and efficiently with this invention.

The isolation method can be spray drying, coagulation, grinding, or other known methods. In accordance with the invention about 0.5 to 50% by weight, preferably 0.5 to 25% by weight, based on impact modifier polymer and stearate coated calcium carbonate, of stearate coated calcium carbonate having an average particle size of about 0.04 to 1 micron is introduced after the formation of the impact modifier polymer but before or during isolation as powders. That is to say, the stearate coated coated calcium carbonate is added either during the polymerization process to form the polymer, or after the polymer is formed but before it is isolated as a powder. When the isolation method is grinding, the stearate coated calcium carbonate can be added at a level over 50% and thereafter partially removed by sieving to reduce its level in the final product to 50% or below.

As stated, particle size of the stearate coated calcium carbonate can average 0.04 to 1 micron, but preferably it is about 0.04 to 0.5 microns, more preferably 0.04 to 0.1 micron, and most preferably about 0.075 microns average particle size. The most preferable stearate coated calcium carbonate is one currently sold by Imperial Chemical Industries under the trademark Winnofil S which has a particle size of about 0.075 microns and is non-aggregated.

As shown in the examples which follow, the resultant impact modifier polymer compositions, have improved anti-compaction properties and do not suffer from deleterious effects of prior common spray dry aids on impact properties and the like.

EXAMPLES

The following is a list of examples which indicate the utility of the invention. These, however, are not considered to restrict the broad range of materials, mixing, and testing which can be achieved according to this invention. Through the examples, the term "impact modifier" refers to the combined impact modifier polymer and particulate additive.

EXAMPLE I-III

Using standard emulsion polymerization techniques an acrylic core/shell polymer was prepared using 79.2 parts of butyl acrylate, 0.4 parts of butylene glycol diacrylate, and 0.4 parts of diallyl maleate as the rubbery core followed by 20 parts of methyl methacrylate as the second stage.

The emulsion was spray dried by atomization in the presence of air as the drying medium. To improve spray drying and powder flow properties, particulate additives were fed into the inlet air stream. The additives and levels were as reported in Table I. The bulk densities, which should be as high as possible, and compressibility, which should be as low as possible, confirm the advantage of using a particulate additive.

TABLE I

|  | Particulate Additive, % | Powder Flow Properties | | |
|---|---|---|---|---|
|  |  | Aerated Bulk Density, g/cc | Packed Bulk Density, g/cc | Compressibility, % |
| Example I (comparative) | None, — | 0.17 | 0.35 | 51 |
| II | Winnofil S, 2.3 | 0.49 | 0.56 | 13 |
| III (comparative) | Fumed Silica, 0.8 | 0.45 | 0.53 | 15 |

Bulk density and compressibility are measured as described in *Chemical Engineering*, p. 163, Jan. 18, 1965.

EXAMPLE IV-V

A series of impact modifiers similar to those of Example I-III were tested for compaction by the following method: The powder sample is screened through a No. 8 mesh screen into a 3"×5"×4" box. The box is weighed and the weight of the sample is recorded. A smaller box containing weights is placed on the sample to provide a load of 0.84 lbs./in$^2$. This unit is vibrated rapidly for 15 minutes. After vibrating, the sample is pressed out onto the No. 8 mesh screen. (If no brick is formed, the test is terminated). The screen is vibrated for 15 minutes. The weight remaining on the screen after this period is recorded as a percentage of the original weight and is called the compaction number. Compaction ranges in the series are shown in Table II.

TABLE II

|  | Particulate Additive, % | Compaction Number, % |
|---|---|---|
| Example IV | Winnofil S, 2.5–3.0 | 0 |
| Example V (comparative) | Fumed Silica, Approx. 1.0 | 10–40 |

These results show the dramatic improvement in compaction which is obtained by switching to the small particle size stearate coated calcium carbonate.

EXAMPLE VI-VIII

Impact modifiers according to Examples I-III were incorporated into PVC by conventional two-roll milling and compression molding. The ⅛" thick molded slabs were cut into test samples. The formulation was PVC K=69/impact modifier/butyl tin stabilizer/acrylic processing aid/parafin wax, MP 165° C./calcium stearate/TiO$_2$/stearamide lubricant in the ratios of 100/8/2.0/2.4/0.75/1.5/14/0.5. The ratio of modifier includes the acrylic core/shell polymer plus the particulate additive if present. The resulting impact strengths are reported in Table III.

TABLE III

|  | Particulate Additive, % | Izod Impact Strength, ft.-lb./in. notch | | |
|---|---|---|---|---|
|  |  | 23° C. | 19° C. | 16° C. |
| Example VI (comparative) | None, — | 30 | 27 | 6.3* |
| Example VII | Winnofil S, 2.3 | 30 | 27 | 11* |
| Example VIII (comparative) | Fumed Silica, 0.8 | 30 | 26 | 5.8* |

*Values indicate both clean and hinged breaks were observed.

When no impact modifier was incorporated the values were 16*, 1.7, and 1.9 for 23°, 19°, and 16° C., respectively. These examples show that the excellent impact strength enhancement imparted by the impact modifier containing a low level of fumed silica is maintained when the particulate additive is changed to a higher level of a small particle size stearate coated calcium carbonate.

EXAMPLE IX-XXIII

To illustrate the fact that even high levels of small particle size stearate coated calcium carbonate have no negative effect on impact strength, acrylic core/shell polymers, as before, were incorporated into PVC. In this case, 1 to 12 percent of the small particle size stearate coated calcium carbonate were added by spray drying. The PVC formulation is as in the previous example. The impact strengths are reported in Table IV.

TABLE IV

| Example No. | Level of Impact Modifier, phr. | Calcium Carbonate percent of Impact Modifier | Izod Impact Strength, Ft-lb/in notch | | |
|---|---|---|---|---|---|
|  |  |  | 23° C. | 16° C. | 10° C. |
| IX | 4 | None | 24* | 18* | 4.6 |
| X | 4 | 1 | 31 | 18* | 6.5* |
| XI | 4 | 3 | 28 | 16* | 3.0 |
| XII | 4 | 8 | 33 | 24* | 12* |
| XIII | 4 | 12 | 26* | 12* | 11* |
| XIV | 6 | None | 31 | 17 | 18* |
| XV | 6 | 1 | 30 | 21* | 7.0* |
| XVI | 6 | 3 | 32 | 26 | 22* |
| XVII | 6 | 8 | 29 | 14* | 13* |
| XVIII | 6 | 12 | 28* | 22* | 11* |
| XIX | 8 | None | 30 | 25 | 12* |
| XX | 8 | 1 | 31 | 29 | 17* |
| XXI | 8 | 3 | 29 | 21* | 5.9* |
| XXII | 8 | 8 | 31 | 26 | 25 |
| XXIII | 8 | 12 | 27 | 18* | 9.8* |

When no impact modifier was incorporated, the values 17*, 3.1, and 2.8 at 23, 16 and 10° C., respectively.

EXAMPLE XXIV-XXVI

Using the arylic core/shell polymer described above, several small size stearate coated calcium carbonates were compared for their effects on powder flow properties. In these examples, the calcium carbonates were added to the previously isolated acrylic polymer. The acrylic polymer powder and the calcium carbonates were mixed in a Waring Blender. The powder flow properties are reported in Table V.

TABLE V

| | Calcium Carbonate | | Powder Flow Properties | | |
|---|---|---|---|---|---|
| | Ultimate Particle Size, microns | Percent of Total Impact modifier | Aerated Bulk Density, g/cc | Packed Bulk Density, g/cc | Compressibility, % |
| Example XXIV | 0.075 (non-aggregated) | 3 | 0.44 | 0.54 | 19 |
| Example XXV | 0.050 (aggregated) | 3 | 0.39 | 0.49 | 20 |
| Example XXVI | 0.70 | 5 | 0.34 | 0.47 | 28 |

These examples show that the 0.70 micron particle size stearate coated calcium carbonate is much less efficient in improving powder flow properties compared to the smaller particle size materials. These examples also show that while ultimate particle size is important, the extent to which the particles are aggregated is also important. The 0.050 micron particle size material which has aggregated particles is less effective than the 0.075 micron particle size material, which has more separate particles. These examples also show that addition of the flow improver after the isolation of the polymer is an effective method for improving powder flow properties.

EXAMPLES XXVII-XXXIII

An acrylic core/shell polymer was mixed with the small particle size stearate coated calcium carbonates from the previous examples and incorporated into PVC in order to determine impact strengths. The formulation was PVC K=55/butyl tin stabilizer/acrylic processing aid/acrylic lubricating processing aid/glyceryl monostearate lubricant/polyethylene lubricant/TiO$_2$/impact modifier in the ratio of 100/2.0/2.0/0.5/2.5/0.25/2.0/15.0. The resulting impact strengths are reported in Table VI.

TABLE VI

| | Calcium Carbonate | | Izod Impact Strength, ft-lb/in notch | | |
|---|---|---|---|---|---|
| Example No. | Ultimate Particle Size, microns | Percent of Total Impact modifiers | 23° C. | 16° C. | 12° C. |
| XXVII | 0.075 (non-aggregated) | 3 | 23 | 18 | 15 |
| XXVIII | 0.075 (non-aggregated) | 5 | 22 | 17 | 14* |
| XXIX | 0.050 (aggregated) | 3 | 21 | 13* | 2.8 |
| XXX | 0.050 (aggregated) | 5 | 20 | 2.9 | 2.2 |
| XXXI | 0.70 | 3 | 22 | 9.6* | 2.4 |
| XXXII | 0.70 | 5 | 21 | 3.0 | 5.6* |
| XXXIII | None | | 23 | 21 | 17* |

When no impact modifier was incorporated, the values were 0.5, 0.3 and 0.5 at 23°, 16° and 12° C., respectively. These examples show that the 0.075 micron particle size material, which has mostly non-aggregated particles, shows no negative effect on impact strength.

EXAMPLE XXXIV

To illustrate the unexpected ability to isolate, by spray drying, a core/shell polymer with rubber content in excess of 85 percent, an acrylic core/shell polymer similar to that of Example 1 was prepared. In this case, the rubbery core was 88 percent of the total weight. While the pure polymer was extremely tacky and unable to be isolated by spray drying, when Winnofil S was fed into the inlet air stream at approximately 7 percent, the product was isolated as a free flowing powder.

EXAMPLE XXXV-XXXVIII

The impact modifier of example XXXIV along with a lower rubber content control, similar to example I, were incorporated into PVC as before. The formulation was PVC K=61/butyl tin stabilizer/glyceryl monostearate lubricant/montan wax lubricant/impact modifier in the ratios of 100/2.0/0.7/0.3/variable. The impact strengths are reported in Table VII.

TABLE VII

| | Impact Modifier | | | Izod Impact Strength ft. lb/in notch | | |
|---|---|---|---|---|---|---|
| No. | Level, phr | Rubber Content of Core/Shell polymer, % | Percent Winnofil S of Total Impact modifier | 23° C. | 16° C. | 10° C. |
| XXXV | 12 | 80 | 2.7 | 16* | 2.0 | 1.2 |
| XXXVI | 15 | 80 | 2.7 | 25 | 7.6* | 1.4 |
| XXXVII | 12 | 88 | 7.1 | 24 | 1.7 | 1.4 |
| XXXVIII | 15 | 88 | 7.1 | 26 | 18* | 2.3 |

These examples show that core/shell polymers with a rubber content of greater than 85 percent, despite the high level of small particle size stearate coated calcium carbonate needed for spray drying, are indeed superior to the analogs containing less rubber.

EXAMPLE XXXIX

Using polymerization techniques similar to those disclosed in U.S. Pat. No. 3,985,704, an MBS graft polymer was prepared. In this case, the content of the rubbery core accounted for 88 percent of the total weight of the graft polymer. Butadiene represented approximately 75 percent by weight of the rubbery core. The MBS graft polymer was readily isolated by spray drying when Winnofil S was fed into the inlet air stream at the 12 to 15 percent level. The product showed excellent powder flow, not expected of such a rubbery polymer.

EXAMPLE XL-XLV

The MBS graft polymer from example XXXIX and a lower rubber content control were mixed with various levels of Winnofil S and incorporated into PVC as before. The formulation was PVC K=55/butyl tin stabilizer/lubricating processing aid/glyceryl monostearate lubricant/polyethylene lubricant/acrylic processing aid/TiO$_2$/modifier in the ratios of 100/2.0/0.5/2.7/0.3/1.0/2.5/15. The impact strengths are reported in Table VIII.

TABLE VIII

| Ex. No. | Impact Modifier Rubber content MBS graft polymer, % | Percent Winnofil S of Total Impact Modifier | Izod Impact Strength ft.-lb./in. notch 23° C. | 0° C. | −18° C. |
|---|---|---|---|---|---|
| XL | 72 | 5 | 21 | 2.7* | 1.2 |
| XLI | 72 | 10 | 20 | 2.3 | 1.1 |
| XLII | 72 | 15 | 19 | 1.7 | 1.4 |
| XLIII | 88 | 5 | 20 | 15* | 3.0 |
| XLIV | 88 | 10 | 20 | 12* | 1.8 |
| XLV | 88 | 15 | 21 | 12* | 1.9 |

These examples show that MBS graft polymers can also tolerate high levels of small particle size stearate coated calcium carbonate without loss of impact strength. Furthermore, they show that MBS graft polymers with very high rubber contents, not spray driable without the inventive additives, are indeed superior to the less rubbery analogs.

EXAMPLE XLVI-LI

An ethylene/vinyl acetate (EVA) copolymer which has a rubber content 100 percent, 40 percent of which is vinyl acetate, which was obtained in the form of tacky pellets, was examined for its ability to be ground to a powder at room temperature. The EVA was added alone and in the presence of small particle size stearate coated and non-coated calcium carbonates, to a multi-blade cutter (Thomas Wiley Mill, ED-5). The resulting ground particle size was controlled by the choice of screens. The grinding behavior using a 0.078 inch screen is reported in Table IX.

TABLE IX

| Ex. No. | Calcium Carbonate Ultimate Particle Size, Microns | Percent of Total Impact Modifier | Grinding Behavior Weight of Material Added to Cutter, g. | Weight of Material recovered g. | Comment |
|---|---|---|---|---|---|
| XLVI | — | none | — | — | cutter jammed immediately |
| XLVII | 0.075 (non-aggregated) | 40 | 400 | 400 | cutter ran cool, did not jam |
| XLVIII | 0.075 (non-aggregated) | 30 | 400 | 400 | cutter ran cool, did not jam |
| XLIX | 0.075 (non-aggregated) | 25 | 100 | 5 | cutter became hot and jammed |
| L | 0.050 (aggregated) | 40 | 100 | 50 | cutter became hot and jammed |
| LI | 0.050 (non-stearate coated; aggregated) | 40 | 100 | 80 | cutter became hot and jammed |

These examples show that a 100 percent rubber material can be ground to a powder if a grinding aid is present. In this case, the 0.075 micron particle size material, which has mostly non-aggregated particles, is a much more effective grinding aid than is the smaller, but aggregated, material, whether stearate coated or not. These examples also show that at least approximately 30 percent of the efficient grinding aid is needed. The product powders are non-tacky and free flowing.

EXAMPLE NO. LII-LVIII

The EVA-calcium carbonate blends of the previous examples were incorporated into PVC as before. The formulation was that of Example VI except that in each case the EVA was present at 4.8 phr. The calcium carbonate was added at such a level to bring its percent on total impact modifier to the level indicated. The impact strengths are reported in Table X.

TABLE X

| Ex. No. | Calcium Carbonate Ultimate Particle Size, microns | Percent of Total Impact Modifier | Izod Impact Strength ft.-lb./in. notch 23° C. | 16° C. |
|---|---|---|---|---|
| LII | — | none | 26 | 17* |
| LIII | 0.075 (non-aggregated) | 20 | 24 | 20 |
| LIV | 0.075 (non-aggregated) | 40 | 24 | 19 |
| LV | 0.050 (aggregated) | 20 | 23 | 12* |
| LVI | 0.050 (aggregated) | 40 | 19* | 2.9 |
| LVII | 0.050 (non-stearate coated control; aggregated) | 20 | 22 | 10* |
| LVIII | 0.050 (non-stearate coated control; aggregated) | 40 | 22 | 4.4* |

When no impact modifier was incorporated, the values were 4.3* and 1.2 at 23° and 16° C., respectively. These examples show that while both of the 0.050 micron particle size materials have a negative effect on impact strength, the 0.075 micron particle size material has no negative effect, even at 40 percent.

EXAMPLE LIX

This example illustrates that while at least approximately 30 percent of the preferred small particle size stearate coated calcium carbonate is needed in order to effectively grind the EVA at room temperature, that the final product can have well in excess of 70 percent EVA. The ground product from example XLVIII was sieved through a 40 mesh screen to separate the excess calcium carbonate, which was readily separated. The remaining product was analyzed to contain 90 percent EVA and 10 percent calcium carbonate and was a free flowing powder.

EXAMPLE LX

This example illustrates that for grinding purposes, not all of the small particle size stearate coated calcium carbonate must be present as a free powder. A composition identical to that of Example XLVII was prepared by first preparing a pelletized mixture of the EVA and calcium carbonate by melting the EVA in the presence of the calcium carbonate in an extruder (other types of melt mixing will also be effective). This concentrate contained 80 percent EVA. Before placing in the grinder, the pellets were mixed with additional calcium carbonate to bring the concentration of EVA to 60 percent. The pellets were readily ground. This technique is appropriate as long as sufficient excess calcium carbonate is present.

EXAMPLE LXI

This example illustrates that small particle size stearate coated calcium carbonate is useful as a coagulation aid. Equal portions of an MBS graft polymer latex, similar to that of example XXXIX, were coagulated by pouring the latices into separate stirred portions of 2 percent calcium chloride solution which had been heated to 60° C. In one case, sufficient small particle size stearate coated calcium carbonate had been added to the coagulant such that it would be present at 10 percent of the total MBS modifier solids. Both samples were poured into separate vacuum funnels. The sample containing the calcium carbonate showed that the hydrophobic (due to the stearate coating) calcium carbonate remained unwetted over the aqueous solution. Upon vacuum filtration, the calcium carbonate coated the coagulated polymer cake. Further additions of wash water separated the calcium carbonate from the MBS graft polymer until filtered. Since the calcium carbonate remained unwetted over the water, its small particles in no way interfered with the filtration process. After final filtration, minimal mixing caused the calcium carbonate to uniformly coat the MBS graft polymer. After oven drying, the two samples were compared. The sample containing the small particle size stearate coated calcium carbonate showed superior visual powder flow, smaller bulk particle size, and greater bulk density (50 percent greater) than the pure MBS graft polymer.

EXAMPLE LXII-LXV

Acrylic core/shell polymers similar to those of examples IV and V were incorporated into polybutylene terephthalate (PBT) by extrusion followed by injection molding according to U.S. Pat. No. 4,096,202. The intrinsic viscosity of the PBT was 1.0. The impact strengths are reported in Table XI.

TABLE XI

| Ex. No. | Impact Modifier Level, % | Particulate additive, % | Izod Impact Strength ft. lb/in notch 23° C. |
|---|---|---|---|
| LXII | 10 | small particle size stearate coated calcium carbonate, 3.3 | 2.0 |
| LXIII | 20 | small particle size stearate coated calcium carbonate, 3.3 | 16 |
| LXIV | 10 (comparative) | fumed silica, 1.0 | 1.9 |
| LXV | 20 (comparative) | fumed silica, 1.0 | 15 |

These examples show that high levels of small particle size stearate coated calcium carbonate show no negative effect on PBT impact strength compared to lower levels of fumed silica.

EXAMPLE LXVI-LXVII

Acrylic core/shell polymers similar to those of the previous examples were incorporated into 30 percent fiberglass reinforced polyethylene terephthalate (PET) according to U.S. Pat. No. 4,096,202. The impact strengths are reported in Table XII.

TABLE XII

| Ex. No. | Impact Modifier Level, % | Particulate additive, % | Izod Impact Strength ft. lb/in notch 23° C. |
|---|---|---|---|
| LXVI | 21 | none | 2.4 |
| LXVII | 21 | small particle size stearate coated calcium carbonate, 2.4 | 2.5 |

These examples show that the presence of small particle size stearate coated calcium carbonate has no negative effect on impact strength of PET.

I claim:

1. A method of isolating impact modifier polymers as powders and imparting anti-compaction and powder flow properties to said powders comprising introducing about 0.5 to 50% by weight, based on mixture, of stearate coated calcium carbonate having an average particle size of about 0.04 to 1 micron after formation of said polymer but before or during isolation of powders.

2. Method of claim 1 wherein said polymer is isolated by spray drying, coagulation, or grinding.

3. Method of claim 1 wherein the average particle size is about 0.04 to 0.5 micron.

4. Method of claim 1 wherein the average particle size is about 0.04 to 0.1 micron.

5. Method of claim 1 wherein the average particle size is about 0.075 micron.

6. Method of claim 1 wherein said introduction takes place during said isolation at the point where said polymer is turned into powder.

7. Method of claim 1 wherein said isolation is by grinding, and said stearate coated calcium carbonate is added at a level of over 50% and is thereafter partially removed by sieving to reduce its level in the final product to below 50%.

8. Method of claim 1 wherein said stearate coated calcium carbonate is non-aggregated.

9. Method of claim 8 wherein said stearate coated calcium carbonate has an average particle size of about 0.075 micron.

10. Impact modifier polymer composition having improved anti-compaction properties consisting essentially of impact modifier polymers containing 0.5 to 50% by weight, based on mixture, of stearate coated calcium carbonate having an average particle size of about 0.04 to 1 micron, said impact modifier polymer composition having been isolated by the method of claim 1.

11. Composition of claim 10 wherein said impact modifier polymer is a core-shell polymer.

12. Composition of claim 11 wherein said core-shell polymer has a butadiene polymer or copolymer core.

13. Composition of claim 12 wherein said core-shell polymer is methacrylate-butadiene-styrene, or acrylonitrile-butadiene-styrene.

14. Composition of claim 11 wherein said core-shell polymer has an acrylic rubber core.

15. Composition of claim 11 wherein the core of said core-shell polymer is a rubber and the rubber content of said polymer is at least 60% by weight of the core-shell polymer.

16. Composition of claim 10 wherein the impact modifier polymer is an ethylene-vinyl ester copolymer.

17. Composition of claim 16 wherein the impact modifier is ethylene-vinyl acetate copolymer.

18. Composition of claim 10 wherein the impact modifier polymer is chlorinated polyethylene.

19. Composition of claim 10 wherein the average particle size is about 0.04 to 0.5 micron.

20. Composition of claim 10 wherein the average particle size is about 0.04 to 0.1 micron.

21. Composition of claim 10 wherein the average particle size is about 0.075 micron.

22. Composition of claim 10 wherein said stearate-coated calcium carbonate is non-aggregated.

23. Composition comprising a blend of the impact modifier composition of claim 10 and a thermoplastic matrix polymer selected from the group consisting of nylon, polymethyl methacrylate, polystyrene, thermoplastic polyesters, polycyclohexanedimethanol terephthalate, and polyolefins.

24. Composition of claim 23 wherein the thermoplastic polyester is polyethylene terephthalate or polybutylene terephthalate.

* * * * *